UNITED STATES PATENT OFFICE.

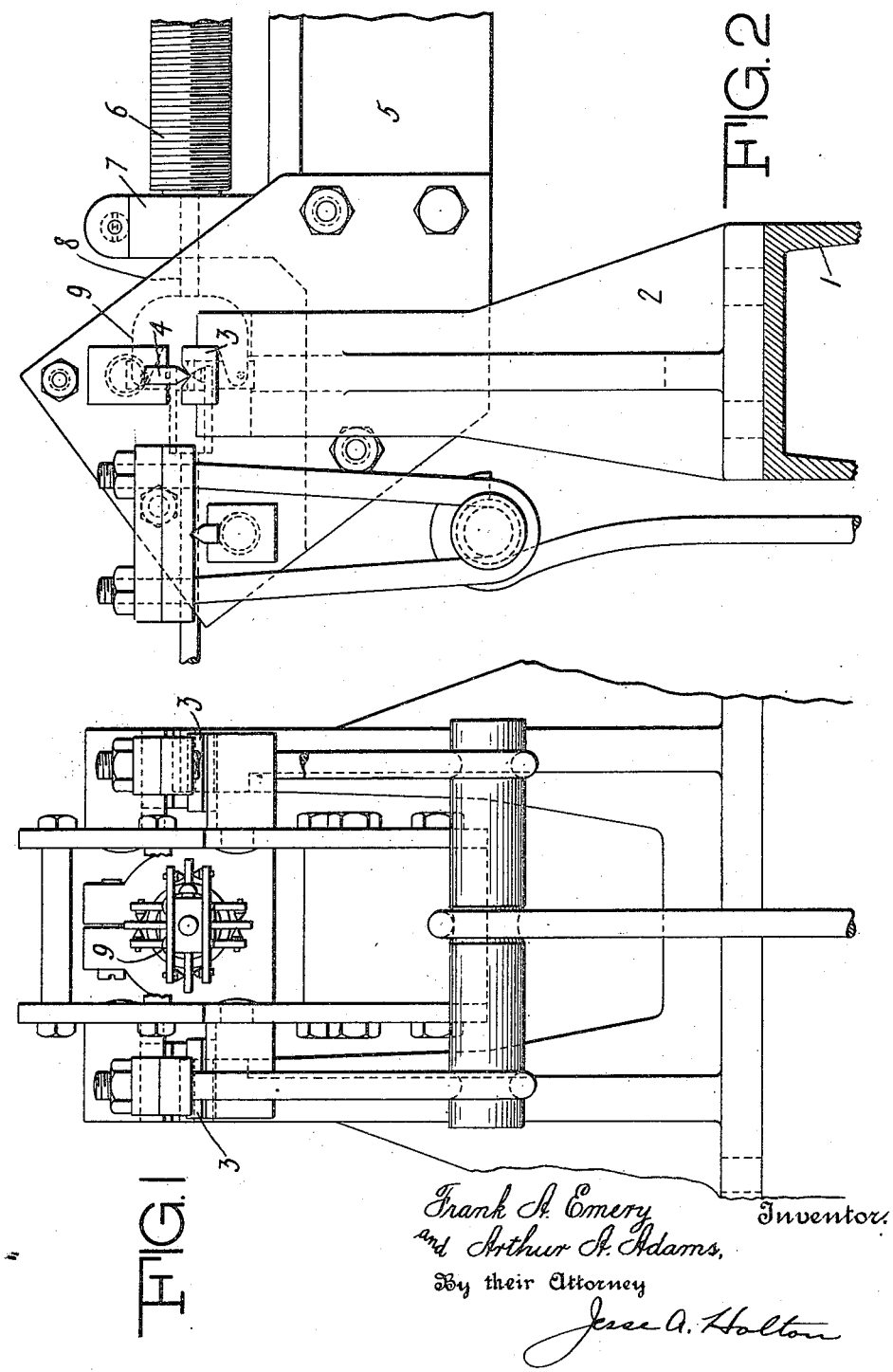

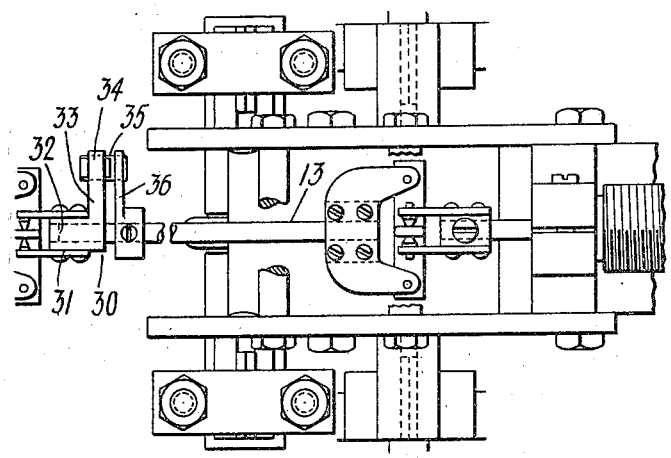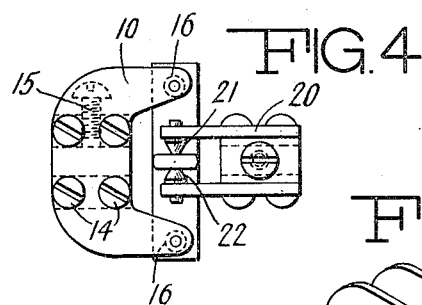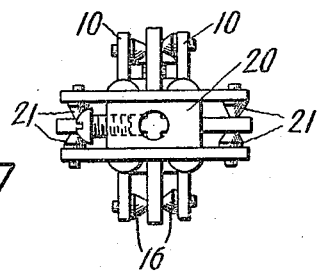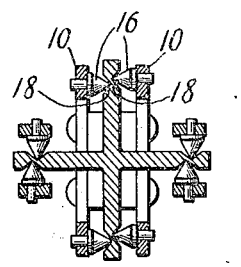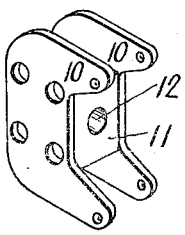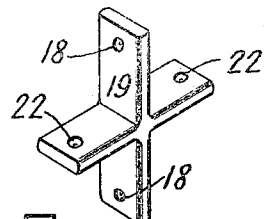

FRANK A. EMERY, OF WELLESLEY HILLS, AND ARTHUR A. ADAMS, OF BROOKLINE, MASSACHUSETTS, ASSIGNORS TO BOSTON SCALE & MACHINE COMPANY, OF SOUTH BOSTON, MASSACHUSETTS.

POWER-TRANSMISSION DEVICE.

1,281,319. Specification of Letters Patent. Patented Oct. 15, 1918.

Original application filed March 5, 1914, Serial No. 822,560. Divided and this application filed May 15, 1917. Serial No. 168,790.

*To all whom it may concern:*

Be it known that we, FRANK A. EMERY and ARTHUR A. ADAMS, citizens of the United States, and residents of Wellesley Hills and Brookline, respectively, in the counties of Middlesex and Norfolk and State of Massachusetts, have invented certain new and useful Improvements in Power - Transmission Devices, of which the following is a specification.

This invention relates to power transmission devices, and with regard to certain more specific features thereof, to universal joints.

The invention finds an important application to apparatus such as electrically-operated weighing machines, wherein a poise is actuated to move along a weighing beam by means of an electric motor supported independently of the beam. In such apparatus, there is no great range of relative angular movement, but it is highly important and desirable that the friction of the connection should be reduced to the least possible value. It is, therefore, one of the objects of the present invention to provide a shaft coupling permitting a suitable range of relative angular movement between the driving and driven members and in which the amount of friction is reduced to a minimum.

Another object of the invention resides in the provision of a simple, inexpensive and durable construction of the character above mentioned.

Other objects will be in part obvious and in part pointed out hereinafter.

The invention accordingly consists in various features of construction, combinations of elements and arrangements of parts which will be exemplified by the construction hereinafter set forth and the scope of the application of which will be indicated in the following claims.

This application is a division of one for weighing machines, Serial Number 822,560, filed by applicants March 5th, 1914.

In the accompanying drawings, wherein is shown one of various possible embodiments of the invention, Figure 1 illustrates, in end view, a portion of a weighing machine comprising the tilting beam and its support including features of the invention.

Fig. 2 is a side view of Fig. 1.

Fig. 3 is a view in top plan of Fig. 1, showing certain additional parts.

Figs. 4, 5 and 6 are assembly views of the universal joint *per se*.

Figs. 7, 8 and 9 illustrate component parts of the joint.

Referring now more particularly to the drawings, wherein similar reference characters refer to similar parts throughout the several views, there is indicated at 1 a support for an upright brace or yoke 2, provided with a pair of knife edge trunnion blocks 3, adapted to receive knife edges 4 projecting from either side of a weighing beam 5. The weighing beam is equipped with a screw-threaded poise shaft 6, supported in bearings provided in arms at either end of the beam, one of which is shown in Fig. 2 at 7. The poise shaft 6 has a reduced portion 8 projecting rearwardly for association with the universal joint or shaft coupling indicated generally at 9. Referring to Figs. 4, 5 and 6, this coupling comprises a pair of yoke plates 10, spaced apart by a block 11, which has a central bore 12 for receiving an end of a shaft 13 on the driving side of the coupling. The yoke plates may be secured to the block 12 by means of screws 14, or bolts, or rivets as desired. A set screw 15 is provided for securing the block 11 to the shaft 13. The yoke plates carry conical bearing pieces 16, having smooth shanks 17, for insertion in said plates. The points of said conical bearings are set in conical seats 18, in one arm of an intermediate cross member 19. It will be observed that the yoke plates provide for upper and lower pairs of cone bearings, but that the bearings of each pair are relatively staggered so that when registering in a horizontal transverse plane, the bearing points are offset, while they are in alinement in a vertical transverse plane. It will be observed, especially from Fig. 6, that the conical bearing pieces 16 are of more acute angles than the bearing seats 18 of the cross member. A similar yoke device 20 is provided for the other arm of the cross member 19 and is connected thereto by similar conical bearings 21 and seats 22. The coupling thus constructed constitutes a highly desirable device having a substantial range of relative movement and a minimum amount of friction.

In weighing machines of the character for which this invention is particularly adapted, there are, of course, practical difficulties in securing absolute alinement of driving and driven members, which are necessarily present as well in any structures. In the great majority of mechanisms, the bearing friction brought about by a rigid shaft coupling would be a matter of no importance. In a weighing machine, however, it is important that the weighing beam and poise should be relieved of all extraneous influences. For a great many reasons it is desirable to drive the screw-threaded poise shaft by a motor arranged off the beam bringing about the necessity for a shaft coupling. In addition, to the necessity for a universal coupling, which is brought about by the practical impossibility of obtaining absolute alinement of two shafts, there is present in a weighing machine a varying angular movement of the driven shaft due to the poise assuming various positions with respect to the balance point and actuating the beam and poise shaft up and down in a vertical plane. This latter movement tends to create a longitudinal pull or strain, the effect of which on the coupling is reduced to a minimum by positioning the latter directly in line with the knife edge fulcrum of the beam. To compensate for this longitudinal pull or strain, and further insuring the friction being reduced to a minimum, there is arranged somewhere in the transmission, preferably at one end of the shaft 13, a slip joint indicated generally in Fig. 3 at 30, the construction being as follows:—

A block 31 is rotatively driven from or with the main driving shaft. This block is bored at 32 to receive the end of the shaft 13 with a sliding fit. The block 31 is also provided with an arm 33, having its outer end 34 yoked to receive a wrist pin 35 on the arm 36 which, in turn, is fixed to the shaft 13. This construction permits a slight relative longitudinal movement between parts of the transmission while, at the same time maintaining strict rotative engagement of the parts.

As many changes could be made in the above construction, and as many apparently widely different embodiments of the invention might be made without departing from the scope thereof, it is intended that all matter set forth in the foregoing description and shown in the accompanying drawings shall be interpreted as illustrative and not in a limiting sense.

Having described the invention, what we claim is:—

1. The combination of driving and driven means with a universal joint connecting the same comprising cross bars, each having two sets of conical bearing seats, the seats of each set being slightly offset from one another and the seats of both sets of a bar having their points in the same straight line; a yoke having conical studs set in the seats in one of said bars and a yoke having conical studs set in the seats in said other bar.

2. The combination of driving and driven elements with a universal joint connecting the same comprising cross members each having adjacent the opposite ends thereof sets of conical bearing seats slightly offset, but in the same straight line; a yoke for one of said members having sets of opposed bearing studs to set into the bearing seats of said member and a yoke for said other member having opposed bearing studs set into the bearing seats of said member.

3. The combination of driving and driven elements with a universal joint connecting the same comprising a cross having four sets of conical bearing depressions therein and yokes having conical studs set into said depressions.

4. The combination of driving and driven elements with a universal joint connecting the same comprising a cross having bearing depressions therein and members having four sets of studs set into said depressions.

5. The combination of driving and driven elements with a universal joint connecting the same comprising cross members having adjacent the ends thereof offset, oppositely directed, bearing depressions, the depressions of one of said members having points all on the same straight line and the depressions of the other member having points all on a straight line transverse to the straight line of said other member; a yoke for one of said members having studs set in the depressions of the latter; and a yoke for said other member having studs set in the depressions thereof.

6. The combination of driving and driven elements with a universal joint connecting the same, comprising a cross having four sets of conical bearing depressions therein and a yoke having conical studs set into said depressions, said studs being of a substantially more acute angle than the said bearing depressions.

7. The combination of driving and driven elements with a universal joint connecting the same, comprising a cross having bearing depressions therein and a member comprising a block and two plates respectively secured to opposite sides thereof, said plates each supporting two bearing studs in such manner that all of the bearing studs lie in one plane, but the two bearing studs supported by one plate are in slightly offset relation to the two bearing studs supported by the other plate.

8. In a universal joint, in combination, two cross-bars each having two sets of tapered bearing seats, the seats of each set being slightly offset from one another and the seats of both sets of a bar having their apexes in the same straight line, a yoke having tapered bearing members set in seats in one of said bars and a yoke having wedge-shaped members set in the seats in said other bar.

9. In a universal joint, in combination, a cross having tapered bearing depressions therein and a member comprising a block and two plates having tapered pieces adapted for engagement with the bearing depressions of said cross, said plates being secured respectively to opposite sides of said block.

FRANK A. EMERY.
ARTHUR A. ADAMS.

Copies of this patent may be obtained for five cents each, by addressing the "Commissioner of Patents, Washington, D. C."